United States Patent
Carey

(10) Patent No.: US 11,611,723 B2
(45) Date of Patent: *Mar. 21, 2023

(54) SELF-HEALING VIDEO SURVEILLANCE SYSTEM

(71) Applicant: James Carey, Commack, NY (US)

(72) Inventor: James Carey, Commack, NY (US)

(*) Notice: Subject to any disclaimer, the term of this patent is extended or adjusted under 35 U.S.C. 154(b) by 105 days.

This patent is subject to a terminal disclaimer.

(21) Appl. No.: 17/341,791

(22) Filed: Jun. 8, 2021

(65) Prior Publication Data

US 2021/0297632 A1 Sep. 23, 2021

Related U.S. Application Data

(63) Continuation of application No. 16/237,979, filed on Jan. 2, 2019, now Pat. No. 11,032,520, which is a (Continued)

(51) Int. Cl.
*H04N 5/77* (2006.01)
*H04N 21/2743* (2011.01)
(Continued)

(52) U.S. Cl.
CPC .......... *H04N 7/181* (2013.01); *G06F 21/55* (2013.01); *H04N 5/77* (2013.01); *H04N 21/2347* (2013.01); *H04N 21/2743* (2013.01)

(58) Field of Classification Search
CPC ...... H04N 7/181; H04N 5/77; H04N 21/2347; H04N 21/2743; G06F 21/55; G06F 9/44505; G06F 11/3051; G06F 11/3086
(Continued)

(56) References Cited

U.S. PATENT DOCUMENTS 6,975,346 B2  12/2005  Kumhyr
7,308,487 B1  12/2007  Dansie et al.
(Continued)

FOREIGN PATENT DOCUMENTS

EP  3073726 A1  9/2016
RU  83675 U1  6/2009
(Continued)

OTHER PUBLICATIONS

Written Opinion of the International Searching Authority for corresponding application No. PCT/US2013/070067, dated Sep. 15, 2015.
(Continued)

*Primary Examiner* — Thai Q Tran
*Assistant Examiner* — Jose M Mesa
(74) *Attorney, Agent, or Firm* — Carter, DeLuca & Farrell LLP

(57) ABSTRACT

A method for configuring a computing device in a network of at least one remote device is disclosed. The method includes: storing, in a remote device, a configuration data archive relating to an existing computing device, wherein the remote device is at least one of a traffic camera or an aerial drone camera; determining, by a computing device to be configured, whether the remote device has stored therein a configuration data archive; and transferring data from the configuration data archive to the computing device to be configured in response to a determination that the remote device has stored therein a configuration data archive.

20 Claims, 5 Drawing Sheets

Related U.S. Application Data continuation-in-part of application No. 15/431,419, filed on Feb. 13, 2017, now Pat. No. 10,349,012, which is a continuation of application No. 14/080,178, filed on Nov. 14, 2013, now Pat. No. 9,571,800.

(60) Provisional application No. 61/798,940, filed on Mar. 15, 2013.

(51) Int. Cl.
*H04N 21/2347* (2011.01)
*G06F 21/55* (2013.01)
*H04N 7/18* (2006.01)

(58) Field of Classification Search
USPC .................................................. 386/223, 224
See application file for complete search history.

(56) References Cited

U.S. PATENT DOCUMENTS

| | | |
|---|---|---|
| 2004/0161133 A1 | 8/2004 | Elazar et al. |
| 2007/0003141 A1 | 1/2007 | Rittscher et al. |
| 2007/0057049 A9 | 3/2007 | Kundu et al. |
| 2007/0127774 A1 | 6/2007 | Zhang et al. |
| 2007/0254634 A1 | 11/2007 | Costa-Requena et al. |
| 2007/0260738 A1 | 11/2007 | Palekar et al. |
| 2007/0297607 A1 | 12/2007 | Ogura et al. |
| 2008/0018738 A1 | 1/2008 | Lipton et al. |
| 2008/0082744 A1 | 4/2008 | Nakagawa |
| 2008/0106599 A1 | 5/2008 | Liu et al. |
| 2008/0263610 A1* | 10/2008 | Murray ............... G06F 16/40 725/110 |
| 2009/0222388 A1 | 9/2009 | Hua et al. |
| 2009/0222466 A1 | 9/2009 | Allison et al. |
| 2010/0026802 A1 | 2/2010 | Titus et al. |
| 2010/0097473 A1* | 4/2010 | Park ............... H04N 21/43622 348/211.3 |
| 2010/0135643 A1 | 6/2010 | Fleming |
| 2010/0182428 A1 | 7/2010 | Lu et al. |
| 2010/0321183 A1 | 12/2010 | Donovan et al. |
| 2011/0219385 A1* | 9/2011 | Jacobson ............ G06F 9/44505 709/224 |
| 2012/0008836 A1 | 1/2012 | Bobbitt et al. |
| 2012/0113265 A1 | 5/2012 | Galvin |
| 2012/0198221 A1 | 8/2012 | Tukol et al. |
| 2012/0311564 A1 | 12/2012 | Khalid |
| 2012/0324061 A1 | 12/2012 | Parsons et al. |
| 2014/0270682 A1 | 9/2014 | Carey |

FOREIGN PATENT DOCUMENTS

| | | |
|---|---|---|
| RU | 2459267 C2 | 8/2012 |
| RU | 2646309 C1 | 3/2018 |
| WO | 2007139994 A2 | 12/2007 |
| WO | 2011034457 A1 | 3/2011 |
| WO | 2012102909 A1 | 8/2012 |
| WO | 2012170551 A2 | 12/2012 |
| WO | 2013030296 A1 | 3/2013 |
| WO | 2014155958 A1 | 10/2014 |
| WO | 2016059213 A1 | 4/2016 |

OTHER PUBLICATIONS

Extended European Search Report for application No. EP 14 76 4242 dated Aug. 26, 2015, 9 pages.
Daniel A. Vaquera et al., "Attribute-Based People Search," Chapter 14, Intellegent Video Surveillance: Systems and Technology, published Dec. 7, 2009, pp. 387-405.
International Preliminary Report on Patentability for corresponding Application No. PCT/US2013/070067, dated Sep. 15, 2015.
Anonymous: "Configuration Backup Restore", Jun. 30, 2010 (Jun. 30, 2010), XP055127450, retrived from the Internet: URL: https://downloads.avaya.com/css/P8/documents/1 00088380 [retrieved on Jul. 8, 2014].
International Search Report for corresponding PCT Application No. PCT/US2013/070067, dated Jul. 21, 2014, 4 pages.
Song et al., "Real-Time Monitoring for Crowd Counting Using Video Surveillance and GIS," IEEE, 2nd International Conference on Remote Sensing, Environment and Transportation Engineering (RSETE), Jun. 1, 2012, 4 pages.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
Russian Office Action dated Feb. 15, 2017 in corresponding Russian Patent Application No. 2015138956 with English-translation, 13 pages.
Canadian Office Action dated Oct. 16, 2017 in Appl. No. CA 2,906,353 (4 pages).
Canadian Office Action issued in Appl. No. 2,965,917 dated Mar. 27, 2018 (5 pages).
European Office Action dated Jul. 12, 2018 issued in corresponding EP Appln. No. 13859615.
Canadian Office Action dated Mar. 1, 2019 issued in corresponding CA Appln. No. 2,965,917.
Anonymous: "Configuration Backup Restore", Jun. 30, 2010 (Jun. 30, 2010), XP055127450, retrived from the Internet: URL: https://downloads avaya.com/css/P8/documents/1 00088380 [retrieved on Aug. 7, 2014].
Extended European Search Report dated Jan. 3, 2020 issued in corresponding EP Appln. No. 19200388.7.
Brazilian Office Action dated Feb. 11, 2020 issued in corresponding BR Appln. No. 1120150233015.
Canadian Office Action dated Apr. 22, 2020 issued in corresponding CA Appln. No. 2,965,917.
European Search Report dated May 18, 2020 issued in corresponding EP Appln. No. 19219897.6.
Canadian Office Action dated Appl. No. 2,965,917 dated Mar. 27, 2018 (5 pages).
Russian Office Action dated Jan. 27, 2021 issued in corresponding Russian Appln. No. 2017138110.
European Examination Report dated Mar. 22, 2021 issued in corresponding EP Appln. No. 19219897.6.

* cited by examiner

SELF-HEALING VIDEO SURVEILLANCE SYSTEM

CROSS-REFERENCE TO RELATED APPLICATIONS

This application is a continuation of U.S. patent application Ser. No. 16/237,979, filed on Jan. 2, 2019, which is a continuation-in-part of U.S. patent application Ser. No. 15/431,419, filed on Feb. 13, 2017, now U.S. Pat. No. 10,349,012, which is a continuation of U.S. patent application Ser. No. 14/080,178, filed on Nov. 14, 2013, now U.S. Pat. No. 9,571,800, which claims the benefit of, and priority to, U.S. Provisional Patent Application Ser. No. 61/798,940, filed on Mar. 15, 2013. The disclosures of each of these foregoing applications are hereby incorporated by reference herein in their entireties for all purposes.

BACKGROUND

1. Technical Field

The present disclosure is directed to systems and methods for the automated backup and recovery of digital data, and, in particular, to systems and methods for storing server configuration information on one or more remote devices and for automatically locating, identifying, and retrieving the stored data for use by a replacement server.

2. Background of Related Art

Many modern enterprises depend upon information technology to achieve mission objectives, to manage administrative tasks, to build and maintain a competitive advantage in the marketplace, to ensure compliance, and to enhance security. As a result, computing devices of all types are in common business use, such as desktop computers, laptop computers, mobile devices such as tablets and smart phones, and server computers. In addition, a wide range of specialized devices are in common use, such as printers, scanners, still and video cameras, biometric devices (hand, retina, fingerprint scanners) and automated identification devices (barcode scanners and RFID devices).

Servers play a vital role in an organization's information infrastructure, because they provide the fundamental storage, processing, and communication functions necessary for the operation of the other computing devices in the enterprise. As a result, the continuous, uninterrupted availability of servers is a much-desired goal of the system administrator. This goal, however, is elusive, because failures inevitably occur due to hardware faults, software errors, or power failures. Techniques have been devised which reduce the occurrence and/or mitigate the effects of a server crash, such as the use of redundant or standby servers, server clustering, cloud computing, virtual server pools, and so forth. However, these techniques may have drawbacks, such as high cost, requiring a high level of technical skill to maintain, or are prohibitively expensive for many small businesses. Moreover, in many instances a server may need to be replaced due to an irreparable failure, upgrade, or even theft of equipment.

Typically, when a server is deployed, the operating system and application software is installed onto the server prior to delivery to the end-user. However, before the server is placed into service, a number of configuration settings which tailors the operation of the server to its environment must be entered. Such configuration settings include network settings, user accounts, user data, application data, authentication and access control data, and information relating to other devices with which the server must communicate. Manual entry of configuration data is slow and error-prone, and relies upon the accuracy and completeness of the last recorded set of configuration parameters. Often no such record exists, because a backup was never performed, the backup device was lost or stolen, or configuration notes were lost, illegible, or incorrect.

SUMMARY

Disclosed is a self-configuring computer deployment system. The disclosed system, and related methods, enables a new computer, and, in particular, a server computer, that is deployed into an existing environment to rapidly and conveniently self-configure or "self-heal" using configuration data that was previously stored in other devices residing on the network, such as an IP-based digital camera. In this manner, the deployment of replacement servers may be accomplished more quickly, with less effort, and with less chance for error.

In accordance with one aspect of the present disclosure, a self-configuring video surveillance system is described. The self-configuring video surveillance system includes one or more surveillance cameras that are configured to store configuration data of a network video recorder, and a network video recorder in operable communication with the surveillance cameras. In some embodiments, the at least one surveillance camera is at least one of a traffic camera or an aerial drone camera. The network video recorder includes configuration data, and a module configured to store the configuration data on the surveillance cameras, and/or retrieve configuration data stored in the surveillance cameras. In some embodiments, the network video recorder includes the ability to record video from one or more digital cameras (e.g., IP-based) and may include the ability to record video from one or more analog cameras (e.g., NTSC, PAL, RGB, composite video, component video, etc.).

In some embodiments, the surveillance cameras may include an IP-based video camera. In other embodiments, the self-configuring video surveillance system may include a plurality of surveillance cameras that are configured to store configuration data of a network video recorder. The module may be configured to store the configuration data among two or more of the plurality of surveillance cameras such that each of the two or more of the plurality of surveillance cameras stores a portion of the configuration data that is less than all of the configuration data.

In still other embodiments, the configuration data is stored in one or more surveillance cameras in encrypted format. In some embodiments, the configuration data includes eXtensible Markup Language (XML) data. In yet other embodiments, the module is configured to validate the integrity of the configuration data retrieved from the surveillance cameras.

In another aspect of the present disclosure, a method for configuring a computing device in a network of at least one remote device is disclosed. In some embodiments, the method includes periodically storing, in one or more remote devices of the network of remote devices, a configuration data archive relating to an existing computing device. In some embodiments, the remote device is at least one of a traffic camera or an aerial drone camera. In other embodiments, the existing computing device may include a network video recorder. In still other embodiments, the remote device(s) may include one or more IP-based video cameras having the ability to store user data, e.g., configuration data.

The method may also include placing a computing device to be configured into operable communication with the network of remote devices. In one embodiment, this may include deploying a new or replacement network video recorder, with no configuration data, into an established site. In other embodiments, this may include establishing a network link between the new or replacement network video recorder and the established network of IP-based cameras. The method may include determining, by the computing device to be configured, whether the remote devices of the network of remote devices has stored therein a configuration data archive and, in response to a determination that the remote devices of the network of remote devices has stored therein a configuration data archive, transferring data from the configuration data archive to the computing device to be configured.

In some embodiments, the new network video recorder locates and identifies whether any IP-based video cameras are reachable within the network (e.g., within the local subnet) to which the network video recorder is connected. When such a camera is identified, a communications channel is established between the camera and the network video recorder, and any configuration data that is stored in the camera is downloaded to the network video recorder.

The method may also include configuring the computing device to be configured with data from the configuration data archive. In some embodiments, this includes applying the downloaded configuration data to the corresponding configuration settings of the network video recorder. Such configuration data settings may include, without limitation, network configuration of one or more network interfaces of the network video recorder, site data, username and password data, operational data associated with the site's IP cameras (including IP address, camera name, resolution, color depth, bitrate, framerate, compression and encoding scheme, location, position, height, angle of view, focal length, etc.), operational data associated with the site's analog cameras, if any (including camera name, input port, resolution, framerate, etc.), scheduling data, triggers, auxiliary inputs, customizations, and so forth.

In yet another aspect, disclosed is a method for configuring a computing device in a network of remote devices. In some embodiments, the disclosed method includes transferring the configuration data of an existing computing device to a plurality of remote devices, wherein the configuration data is apportioned among two or more of the plurality of remote devices such that each of the two or more of the plurality of remote devices stores a portion of the configuration data that is less than all of the configuration data. In some embodiments, the plurality of remote devices includes at least one of a traffic camera or an aerial drone camera. In this manner, a level of data security is achieved by ensuring no one IP camera includes all of the configuration data of the network video recorder. In some embodiments, the configuration data is redundantly stored among the two or more of the plurality of remote devices, such that if one or more of the two or more of the plurality of remote devices becomes unavailable, e.g., through theft or catastrophic failure, a complete copy of the distributed configuration data may be reconstructed from the remaining remote devices.

The method may also include placing a computing device to be configured into operable communication with the network of remote devices, identifying, by the computing device to be configured, which of the two or more of the plurality of remote devices has stored therein configuration data, transferring the stored configuration data portions from each of the identified remote devices to the computing device to be configured, reassembling the configuration data from the configuration data portions, and configuring the computing device to be configured using the configuration data.

In some embodiments, reassembling the configuration data from the configuration data portions includes confirming that the configuration data is complete. In other embodiments, the configuration data is stored on the remote device in an encrypted format.

In another aspect, the present disclosure is directed to a method for configuring a computing device in a network of one or more remote devices. The method includes storing, in a remote device, a configuration data archive relating to an existing computing device, determining, by a computing device to be configured, whether the remote device has stored therein a configuration data archive. In some embodiments, the remote device is at least one of a traffic camera or an aerial drone camera. In response to a determination that the remote device has stored therein a configuration data archive, data is transferred from the configuration data archive to the computing device to be configured.

In some embodiments, storing is performed in accordance with a schedule. The schedule may include regular intervals (hourly, daily, weekly etc.) and/or may include arbitrary times, user-specified times. In some embodiments, storing is performed in response to an input or an event, such as, without limitation, an intrusion detection (hack-in detection, virus or malware detection, premises burglary alarm, etc.) and/or malfunction detection (software crash, hardware error, exceeding a S.M.A.R.T. hard drive error threshold, power failure, UPS battery alarm, etc.). In other embodiments, the configuration data is stored on the remote device in an encrypted format. In still other embodiments, the computing device to be configured includes a network video recorder. In yet other embodiments, the method includes placing the computing device to be configured into operable communication with the network of the one or more remote devices. In yet another embodiment, the method includes configuring the computing device to be configured with data from the configuration data archive.

In still another aspect, the present disclosure is directed to a method for configuring a computing device in a network of remote devices that includes transferring the configuration data of an existing computing device to a plurality of remote devices, wherein the configuration data is apportioned among two or more of the plurality of remote devices such that each of the two or more of the plurality of remote devices stores a portion of the configuration data that is less than all of the configuration data and identifying, by a computing device to be configured, which of the two or more of the plurality of remote devices has stored therein configuration data. In some embodiments, the plurality of remote devices includes at least one of a traffic camera or an aerial drone camera. The stored configuration data portions from each of the identified remote devices is transferred to the computing device to be configured.

In embodiments, the disclosed method includes reassembling the configuration data from the configuration data portions. In other embodiments, reassembling the configuration data from the configuration data portions includes confirming that the configuration data is complete. In yet other embodiments, the method includes configuring the computing device to be configured using the configuration data. In still other embodiments, the configuration data is stored on the remote device in an encrypted format. Transferring may be performed in accordance with a schedule. The computing device may be configured to include a network video recorder. The method may include placing the computing device to be configured into operable communication with the network of remote devices.

In still another aspect, the present disclosure is directed to a self-healing video surveillance system having one or more surveillance cameras configured to store configuration data of a network video recorder in operable communication with the surveillance cameras. In some embodiments, the one or more surveillance cameras may be included in at least one of a traffic camera or an aerial drone camera. The network video recorder includes configuration data, and a module configured to store the configuration data on the surveillance cameras and retrieve configuration data stored in the surveillance cameras. In embodiments, the surveillance cameras include an IP-based video camera. The module may be configured to store the configuration data in two or more remote devices such that each of the remote devices stores a portion of the configuration data that is less than all of the configuration data. In embodiments, the configuration data stored in the surveillance cameras is encrypted. In other embodiments, the configuration data includes eXtensible Markup Language data. The module may be configured to validate the integrity of the configuration data retrieved from the surveillance cameras.

In another aspect, the present disclosure is directed to a self-healing computer having one or more processors configured to perform the operation of storing, in a remote device, a configuration data archive relating to an existing computing device and determining, by a computing device to be configured, whether the remote device has stored therein a configuration data archive. In some embodiments, the remote device is at least one of a traffic camera or an aerial drone camera. In response to a determination that the remote device has stored therein a configuration data archive, data from the configuration data archive is transferred to the computing device to be configured. In embodiments, storing is performed in accordance with a schedule. The configuration data may be stored on the remote device in an encrypted format. The computing device to be configured may include a network video recorder.

In still another aspect, the present disclosure is directed to a self-healing video surveillance system having a plurality of surveillance cameras configured to store configuration data of a network video recorder. In some embodiments, the plurality of surveillance cameras includes at least one of a traffic camera or an aerial drone camera. The network video recorder is in operable communication with the at least one surveillance camera, and includes configuration data a module configured to perform at least one of storing the configuration data on the at least one surveillance camera and retrieving configuration data stored in the at least one surveillance camera. In some embodiments, the module is configured to store redundant configuration data among a subset of the plurality surveillance cameras such that the subset of the plurality surveillance cameras stores the entirety of configuration data of the network video recorder.

In another aspect, the present disclosure is directed to non-transitory computer-readable media including software for configuring a computing device in a network including one or more remote devices, which software, when executed by a computer system, causes the computer system to perform the operations of storing, in one or more remote devices, a configuration data archive relating to an existing computing device and determining, by a computing device to be configured, whether the remote device(s) has stored therein a configuration data archive. In some embodiments, the one or more remote devices includes at least one of a traffic camera or an aerial drone camera. In response to a determination that the remote device(s) has stored therein a configuration data archive, the software transfers data from the configuration data archive to the computing device to be configured.

In still another aspect, the present disclosure is directed to non-transitory computer-readable media including software for configuring a computing device in a network of remote devices, which software, when executed by a computer system, causes the computer system to perform the operations of transferring configuration data of an existing computing device to a plurality of remote devices, wherein the configuration data is apportioned among two or more of the plurality of remote devices such that each of the two or more of the plurality of remote devices stores a portion of the configuration data that is less than all of the configuration data. In some embodiments, the plurality of remote devices includes at least one of a traffic camera or an aerial drone camera. A computing device to be configured identifies which of the two or more of the plurality of remote devices has stored therein configuration data, and the stored configuration data portions are transferred from each of the identified remote devices to the computing device to be configured.

According to one embodiment of the present disclosure, a method for configuring a computing device in a network of at least one remote device is disclosed. The method includes: storing, in a remote device, a configuration data archive relating to an existing computing device, wherein the remote device is at least one of a traffic camera or an aerial drone camera; determining, by a computing device to be configured, whether the remote device has stored therein a configuration data archive; and transferring data from the configuration data archive to the computing device to be configured in response to a determination that the remote device has stored therein a configuration data archive.

According to an aspect of the above embodiment, storing the configuration data is performed in accordance with a schedule.

According to another aspect of the above embodiment, storing the configuration data is performed in response to an event. The event is selected from the group consisting of an intrusion alert, a hack-in detection, a virus detection, a malware detection, a premises burglary alarm, a malfunction detection, a software crash, a hardware error, and a power failure.

According to a further aspect of the above embodiment, the configuration data is stored on the remote device in an encrypted format. The computing device to be configured includes a network video recorder.

According to yet another aspect of the above embodiment, the method further includes placing the computing device to be configured into operable communication with the network of at least one remote device. The method may also include configuring the computing device to be configured with data from the configuration data archive.

According to another embodiment of the present disclosure, a method for configuring a computing device in a network of remote devices is disclosed. The method includes: transferring configuration data of an existing computing device to a plurality of remote devices, wherein the plurality of remote devices includes at least one of a traffic camera or an aerial drone camera, and wherein the configuration data is apportioned among at least two of the plurality of remote devices such that each of the at least two of the plurality of remote devices stores a portion of the configuration data that is less than all of the configuration data; identifying, by a computing device to be configured, which of the at least two of the plurality of remote devices has stored therein configuration data; and transferring the configuration data portions from each of identified remote devices to the computing device to be configured.

According to one aspect of the above embodiment, the method further includes reassembling the configuration data from the configuration data portions. Reassembling the configuration data from the configuration data portions includes confirming that the configuration data is complete. The method further includes configuring the computing device to be configured using the configuration data. The configuration data is stored in an encrypted format.

According to another aspect of the above embodiment, transferring the configuration data is performed in accordance with a schedule. The computing device to be configured includes a network video recorder. The method further includes placing the computing device to be configured into operable communication with the network of remote devices.

According to a further embodiment of the present disclosure, a self-healing video surveillance system is disclosed. The system includes: at least one surveillance camera configured to store configuration data of a network video recorder, wherein the at least one surveillance camera is at least one of a traffic camera or an aerial drone camera. The network video recorder in operable communication with the at least one surveillance camera, the network video recorder includes: configuration data; and a module configured to perform at least one of storing the configuration data on the at least one surveillance camera and retrieving configuration data stored in the at least one surveillance camera.

According to one aspect of the above embodiment, the at least one surveillance camera includes an IP-based video camera.

According to another aspect of the above embodiment, the system further includes a plurality of surveillance cameras configured to store configuration data of the network video recorder, wherein the module is configured to store the configuration data among at least two of the plurality of surveillance cameras such that each of the at least two surveillance cameras stores a portion of the configuration data that is less than all of the configuration data. The configuration data stored in the at least one surveillance camera may be encrypted.

BRIEF DESCRIPTION OF THE DRAWINGS

Exemplary embodiments in accordance with the present disclosure are described herein with reference to the drawings wherein.

DETAILED DESCRIPTION

Figure 1:
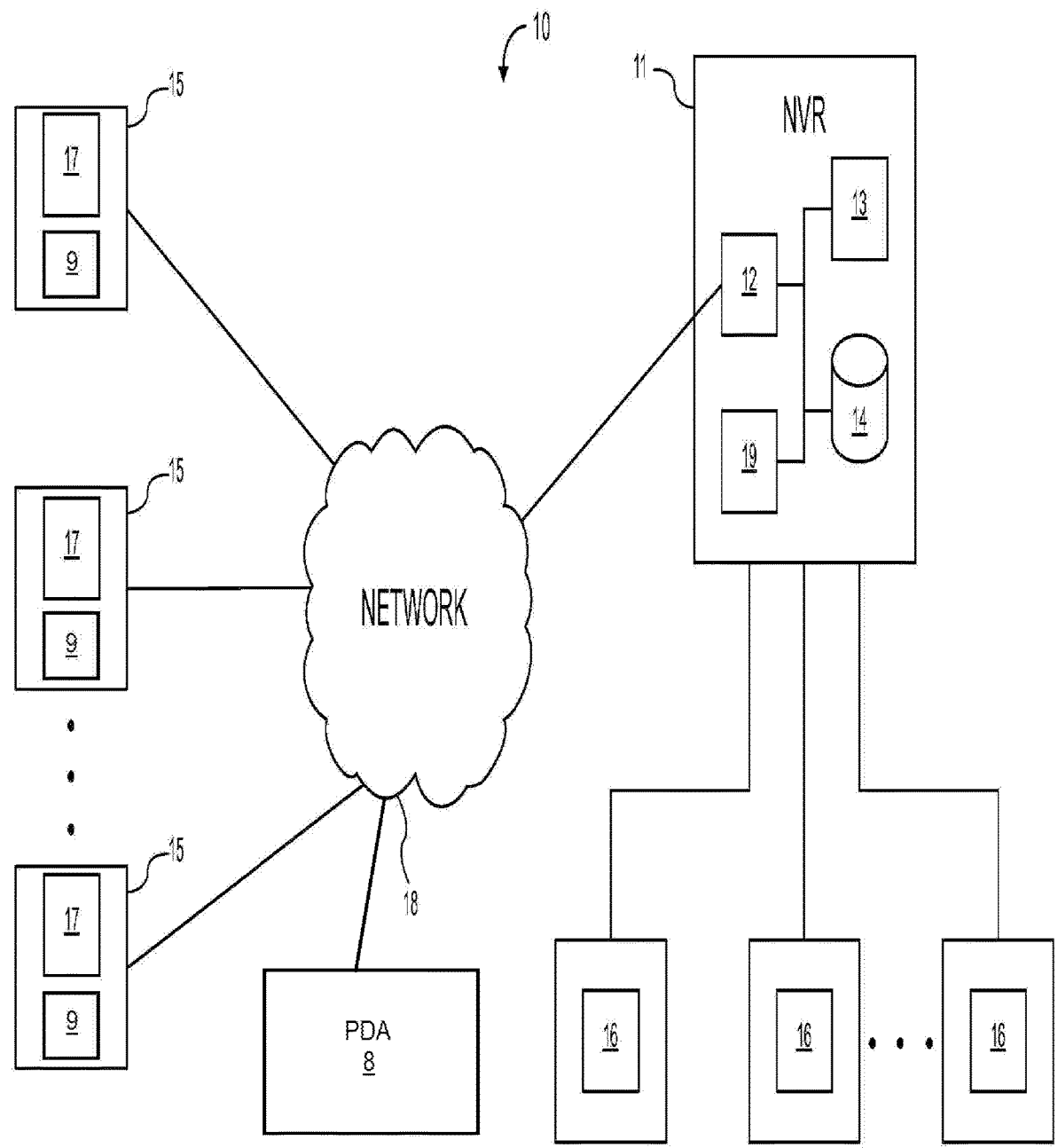
FIG. 1 is a block diagram of an embodiment of a self-healing surveillance network in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions.

Additionally, embodiments of the present disclosure may be described herein in terms of functional block components, code listings, optional selections, page displays, and various processing steps. It should be appreciated that such functional blocks may be realized by any number of hardware and/or software components configured to perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices.

Similarly, the software elements of embodiments of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, Linux, and/or Android®.

Further, it should be noted that embodiments of the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of embodiments of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, embodiments of the present disclosure may be embodied as a method, a data processing system, a device for data processing, and/or a computer program product. Accordingly, embodiments of the present disclosure may take the form of an entirely software embodiment, an entirely hardware embodiment, or an embodiment combining aspects of both software and hardware. Furthermore, embodiments of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

Embodiments of the present disclosure are described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of ways of performing the specified functions, combinations of steps for performing the specified functions, and program instruction ways of performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of embodiments of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, steps recited in any method claims may be executed in any order and are not limited to the order presented in the claims. Moreover, no element is essential to the practice of the disclosure unless specifically described herein as "critical" or "essential."

With respect to FIG. 1, an embodiment of a self-healing surveillance system 10 in accordance with the present disclosure is shown. The disclosed system 10 includes a network video recorder 11 in operable communication with one or more digital video cameras 15 via a network 18. In some embodiments, network 18 may be configured as a TCP/IP network having wired (e.g., Ethernet) and/or wireless (e.g., 802.11 Wi-Fi) network links. The digital video camera(s) 15 may transmit video in any suitable format, such as without limitation, MPEG4 and/or H.264 formatted video. Surveillance system 10 may optionally include one or more analog video cameras 16 that are operably coupled to network video recorder 11, typically by hard-wired link, however in some embodiments, wireless analog video links are also supported.

The digital video camera(s) 15 include(s) a configuration storage unit 17. Configuration storage unit 17 may include a memory or data partition that is configured to store configuration data, and may include non-volatile memory which retains data when power is interrupted. Configuration storage unit 17 may additionally include a software program that executes a method for receiving, storing, and transmitting configuration data as described herein. Configuration storage unit 17 may include a unique identifier, which may be an identifier associated with digital video camera 15, or a unique identifier distinct from an identifier associated with digital video camera 15, such that the video functions of digital video camera 15 may be, but need not be, related to the configuration storage functions of configuration storage unit 17. For example, configuration storage unit 17 may assume a different network (e.g., IP) address from that assigned to the video functions of digital video camera 15. In some embodiments, configuration storage unit 17 may remain inactive, partially active, and/or inaccessible unless and until an unlock code is received by configuration storage unit 17 and/or digital video camera 15. In this manner, the configuration storage functions of configuration storage unit 17 may be accessed only by duly authorized users, certified network video recorders 11, software programs, licensees, and the like. Configuration storage unit 17 may include additional processing components, such as a encryption and decryption component, an XML parsing component, and an authentication component.

Network video recorder 11 includes, in operable communication, a configuration management unit 12, configuration data repository 13, and a storage unit 14, and a processor 19. Configuration data repository 13 contains the configuration data necessary for proper operation of network video recorder 11, as discussed above. During initialization (booting) of network video recorder 11, configuration management unit 12 examines configuration data 13 to determine whether configuration data repository 13 contains null or default values, which indicates that network video recorder 11 is potentially being booted for the first time in a new environment. If this is the case, configuration management unit 12 will attempt to identify, and connect to, any configuration storage units 17 of digital video cameras 15 that are operational on the network 18. If a connection is successful, configuration management unit 12 will determine whether the connected configuration storage unit 17 contains stored configuration data. If so, configuration management unit 12 downloads the stored configuration data from the connected configuration storage unit 17.

If no configuration storage units 17 are identified, or are not found to contain any configuration data, then the installer is prompted to enter configuration data manually and/or download configuration data from an alternative backup source (e.g., USB stick, disk, or via FTP or other network resource).

In some embodiments, configuration management unit 12 validates the downloaded data to confirm that the data is complete and correct. If necessary, configuration management unit 12 may attempt additional connections to other configuration storage units 17 of digital video cameras 15 until a complete and correct set of configuration data has been downloaded. Once a valid set of configuration data is obtained, configuration management unit 12 writes the downloaded data to configuration data repository 13. Network video recorder 11 may then utilize the restored configuration data repository 13 to continue normal operation.

During normal operation, configuration management unit 12 stores, typically on a periodic basis, configuration data from the configuration data repository 13 in the configuration storage units 17 of the digital video camera(s) 15. In some embodiments, the configuration management unit 12 stores configuration data on a daily basis. Configuration management unit 12 may be configured to detect any change to the configuration data repository 13 and, in response, store updated configuration data from the configuration data repository 13 in the configuration storage units 17 of the digital video camera(s) 15. For example, and without limitation, if an installer adds a user, defines a trigger, or changes a camera setting, and as these changes are committed to the configuration data repository 13, the configuration management unit 12 will detect the change and write the updated configuration data to one or more configuration storage units 17. In this manner, a current copy of configuration data is always available to automatically re-configure a new server whenever the need arises.

In some embodiments, where the digital video camera(s) 15 includes the ability to store video, the video stored while a network video recorder 11 is offline is transmitted to a network video recorder 11 when network video recorder 11 again becomes available, e.g., after redeployment and reconfiguration. The digital video camera(s) 15 may include the ability to transmit live video concurrently with transmitting stored video to network video recorder 11.

Figure 2:
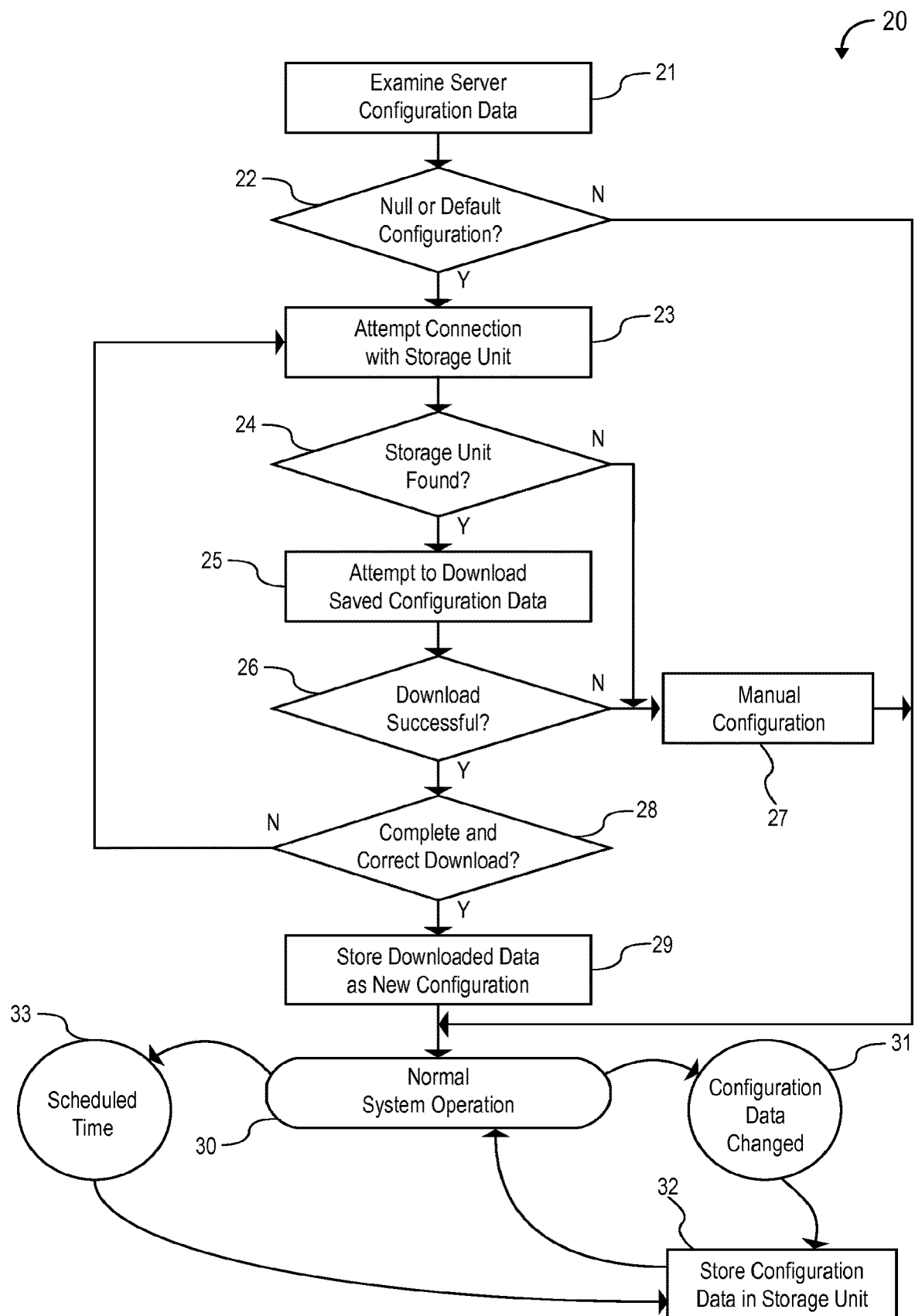
FIG. 2 is a process flow diagram of an embodiment of a method for configuring a server in accordance with the present disclosure.

Turning now to FIG. 2, an embodiment of a method 20 of configuring a server in accordance with the present disclosure is shown. During initialization of the server (e.g., at boot time), in step 21 the server configuration data is examined. If, in step 22 it is determined that the server is configured, the server proceeds with normal operation (step 30). If, however, in step 22 it is determined the server is not configured, e.g., the server configuration data consists of null or default values, then in step 23 an attempt is made to connect with a storage unit (e.g., a remote digital video camera). If in step 24 it is determined a storage unit cannot be found, then processing proceeds with step 27 in which the system is manually configured. If a storage unit is found, then in step 25 an attempt is made to download saved configuration data from the storage unit. If the download is unsuccessful, or no saved configuration data is available, then manual configuration is performed (step 27).

If the saved configuration data is successfully downloaded from the storage unit, then in step 28 the downloaded data is validated to determine that a complete and correct set of configuration data has been obtained. If so, in step 29 the downloaded configuration data is written to the server's configuration data repository (e.g., registry settings, init files, and so forth) and the server proceeds with normal operation (step 30).

If, however, in step 29 the downloaded data is determined to be incomplete and/or incorrect, the process iterates to step 23 and an attempt is made to connect to another storage unit, and repeats until a complete and correct set of configuration data is obtained, or until all available storage units have been queried.

Optionally, if only an incomplete set of configuration data is obtained, but is otherwise correct, then the obtained configuration data is written to the server's configuration data repository, and the missing portions are entered using manual configuration.

During normal system operation (step 30), in the event the server configuration data is changed (step 31), or, a scheduled time arrives (step 33), then in step 32 the current server configuration data is stored in one or more storage units.

Figure 3:
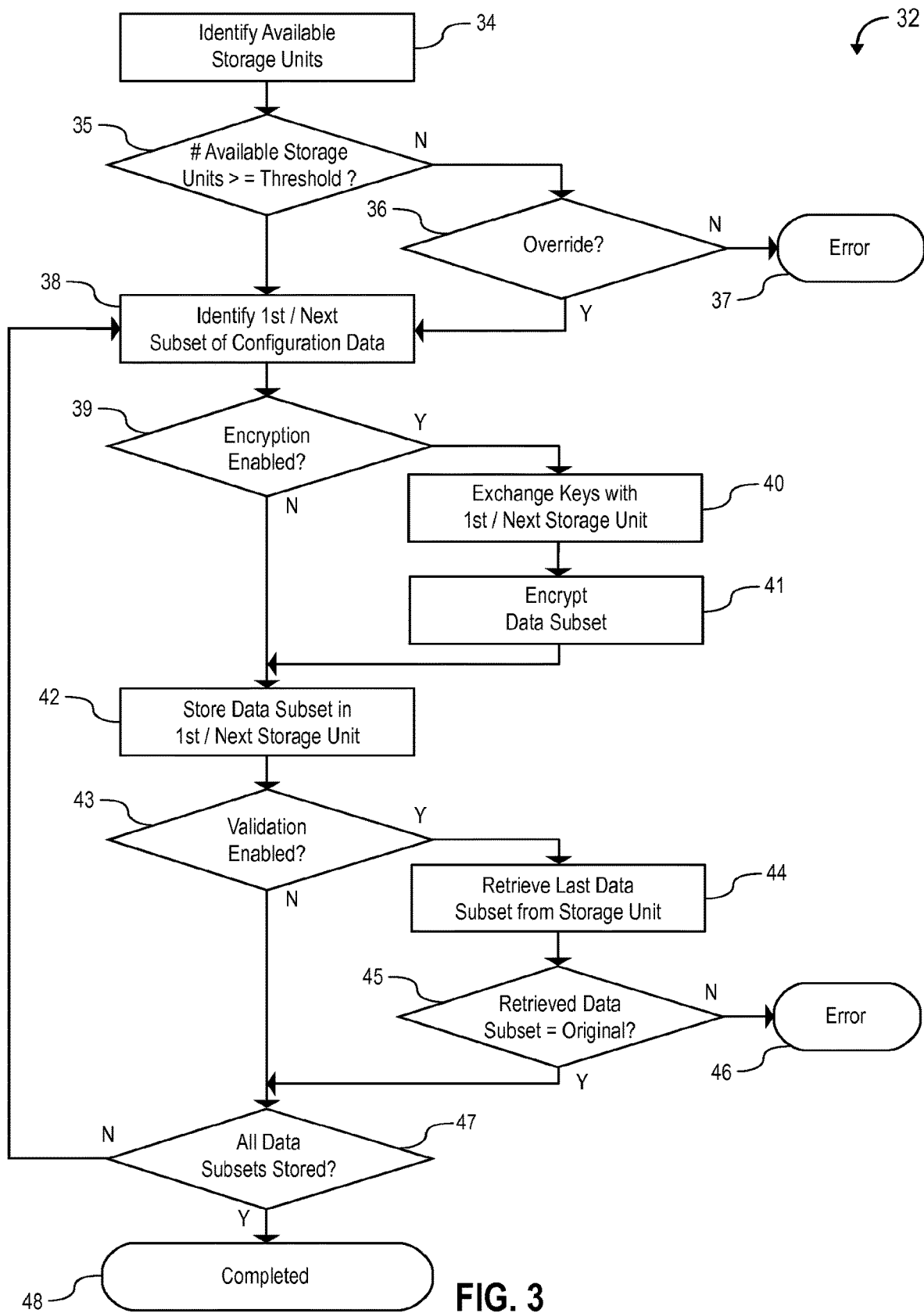
FIG. 3 is a process flow diagram of an embodiment of a method for storing configuration data on a remote device in accordance with the present disclosure.

Turning now to FIG. 3, the method for storing current configuration data of a server on a remote storage unit of step 32 is described in more detail. In step 34, the available storage units (e.g., IP cameras) which are accessible on the network 18 are identified. In step 35, the number of available storage units is compared to a predetermined minimum number of available storage units. For example, the predetermined minimum number may be chosen by a system administrator, may be defined by software licensing or use policy, or may be defined in any other suitable manner. In some embodiments, the predetermined minimum number of units may be one, meaning that storing the entirety of the configuration data set on a single remote storage unit is permissible. In embodiments, the predetermined minimum number of units may be greater than one, which is appropriate when it is desired to distribute the backed up configuration data among several remote storage units to prevent the theft or compromise of any single remote storage unit from yielding the entire configuration data set.

If, in step 35, an insufficient number of storage units are identified, then in step 36 an override request may be issued to a user (e.g., system administrator) who is asked whether to proceed with whatever number of storage units are available. If the override request is declined, then in step 37 an error is flagged. In some embodiments, the user may be asked to modify the predetermined minimum number of available storage units in accordance with the actual number of available storage units in order to facilitate the success of a subsequent storage attempt.

If, in step 35, a sufficient number of storage units are identified or in step 36 an override request is granted, then in step 38 a first subset (or upon successive iterations, a next subset) of configuration data is identified for remote storage on the corresponding first (or next) remote storage device. In embodiments where the predetermined minimum number of units is equal to one, then the subset represents the full set of configuration data. A subset of configuration data may be selected in any number of alternative ways, for example, a subset may represent a contiguous segment of configuration data, interleaved portions of configuration data (e.g., where the number of remote devices is three, every third byte), randomly-selected portions, and so forth.

In embodiments, identification data is appended, or otherwise annexed to, each data subset. Identification data includes, without limitation, a source identifier (e.g., the server to which the configuration data belongs), a timestamp, a subset identifier (for example, "subset 3 of 6"), an encryption key, a checksum, and/or other data which may facilitate the reconstruction of subsets into original form. In some embodiments, the configuration data and/or subsets thereof may be stored in eXtensible Markup Language (XML).

In step 39, a determination is made whether the configuration data is to be transmitted and/or stored in an encrypted format. If so, then in step 40 encryption keys are exchanged between the server and the current remote storage device and in step 41, the configuration data subset is encrypted in accordance with the exchanged keys and desired cryptographic algorithm (e.g., DES, SHA1, RSA, AES, DESX, RC4, MD5-RSA, SHA1-DSA, etc.). In step 41 the data subset is transmitted to and stored in the first/next storage device. In step 43, a determination is made whether to validate the just-stored data (e.g., in accordance with a validation user-preference setting). If so, the just-stored data subset is retrieved from the corresponding remote storage unit, decrypted if necessary, and compared to the original subset. If the retrieved data does not match the original, then in step 46 an error is flagged. In embodiments, a failed validation causes a retry attempt to be made wherein the subset is stored again on the corresponding remote storage device. In embodiments, a different remote storage device may be used to store the subset.

If, however, in step 43 it is determined that no validation is to be performed, or, validation was successful in step 45, then in step 47 a determination is made whether all data subsets have been stored. If one or more subsets remain, then the process iterates with step 38 wherein the next subset is identified for storage. If all data subsets have been stored, then processing concludes with step 48.

Figure 5A:
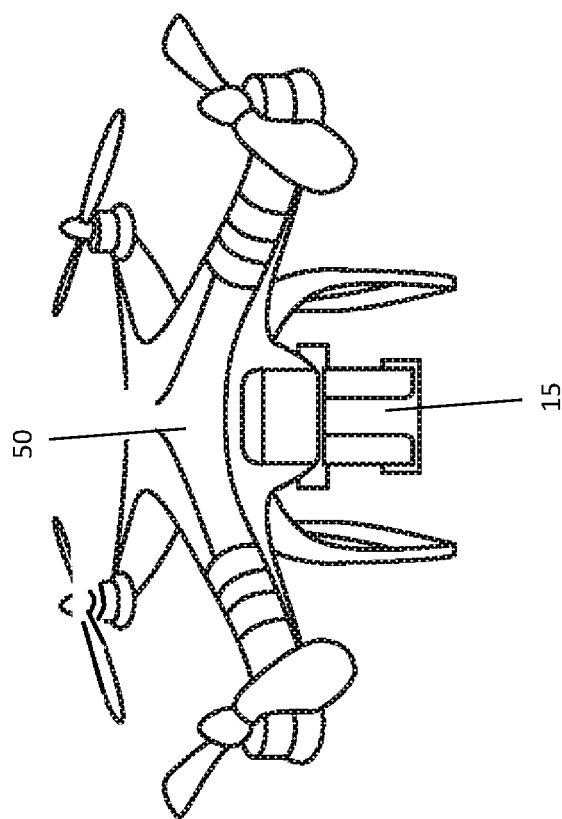
FIG. 5A is a perspective view of an aerial drone according to the present disclosure.
Figure 5B:
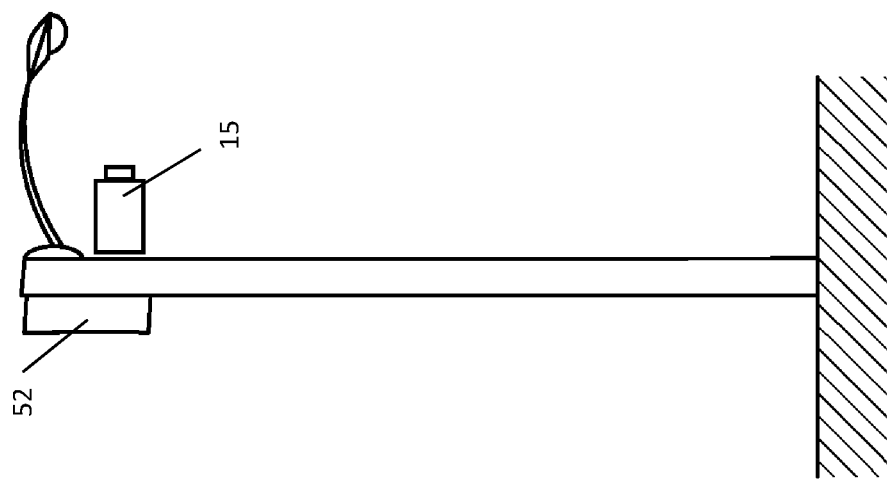
FIG. 5B is a perspective view of a traffic camera according to the present disclosure.

In various embodiments, one or more of the video cameras 15 or one or more of the analog video cameras 16 described above with reference to FIGS. 1-3 may be disposed, included as a part of, or is coupled to, one or more aerial drones 50 as shown in FIG. 5A (also sometimes referred to as unmanned aerial vehicles (UAV)). In further embodiments, the cameras 15 or 16 may be a traffic camera 52 as shown in FIG. 5B, that is configured to capture images of one or more areas and/or subjects to be tracked. The aerial drone camera(s) 50 and/or traffic camera(s) 52 can be employed to perform various functions, such as, for example, the various functions of the video cameras 15 described above with reference to FIG. 1.

Figure 4:
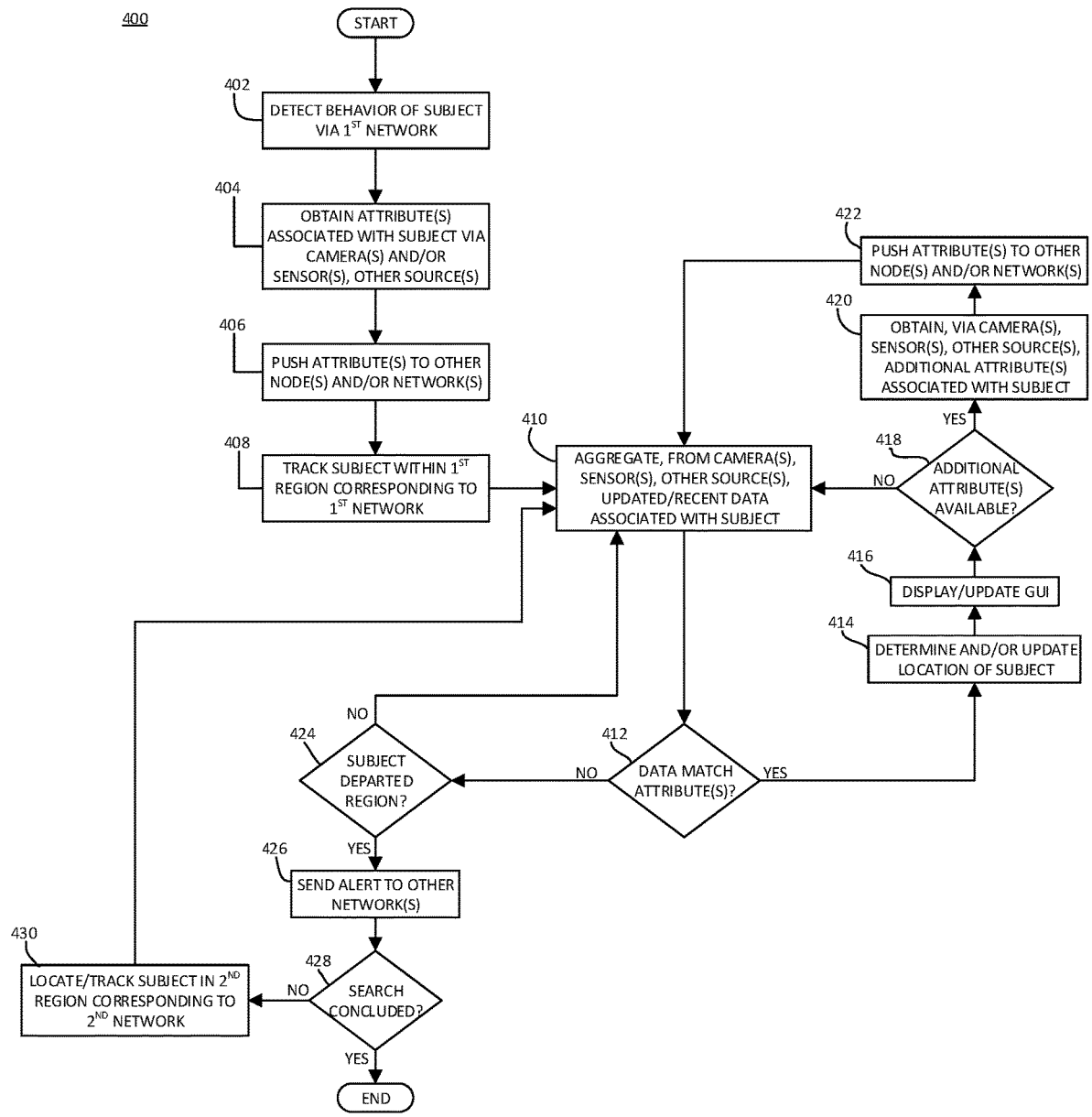
FIG. 4 is a flowchart illustrating an exemplary procedure for locating and/or tracking a location of one or more subjects in accordance with the present disclosure.

In another embodiment, with reference to FIG. 4, one or more aerial drone cameras 50 and/or traffic cameras 52 may be employed, in conjunction with one or more other sources of information in some instances, to perform a method 400 for locating and/or tracking a location of one or more subjects, such as a person who has been detected as having committed a crime at a particular location, across regions that correspond to one or more networks, such as an aerial drone camera network, a traffic camera network, a store camera network, and/or other types of networks. In this manner, communication among multiple nodes and/or networks, including nodes and/or networks that employ aerial drone cameras and/or traffic cameras, can cooperate to facilitate more effective location of subjects and/or tracking of locations of subjects.

At 402, a behavior of a subject is detected in a region, such as a retail store premises, that corresponds to a first network, such as a network including cameras 15, antennas 9, and/or the like. Although the method 400 is described in the context of a single subject or person, the method 400 is also applicable to multiple subjects, such as a group of people who are acting together or separately. Example types of behaviors that can be detected at 402 include, without limitation, an action, an inaction, a movement, a plurality of event occurrences, a temporal event, an externally-generated event, the commission of a theft, the leaving of an unattended package, the commission of violence, the commission of a crime, and/or another type of behavior. In some exemplary embodiments, in addition to, or as an alternative to, detecting a behavior of a subject at 402, an abnormal situation is detected, such as an abnormal condition (pre-programmed condition(s)), an abnormal scenario (loitering, convergence, separation of clothing articles or backpacks, briefcases, groceries for abnormal time, etc.) or other scenarios based on behavior of elements (customers, patrons, people in crowd, etc.) in one or multiple video streams. For the sake of illustration, the description of the method 400 is provided in the context of detecting a behavior of a subject at 402, but the method 400 is similarly applicable to detecting an abnormal situation at 402.

Detection of the behavior of the subject includes obtaining information from one or more source(s), such as video and/or image information of the subject obtained via one or more video cameras 15 installed at or near a premises, non-video information (e.g., mobile communication device data) obtained from one or more antennas 9 installed at or near the premises, information provided by an employee or witness by way of a computer or network video recorder 11 at the premises, and/or other types of information obtained from other types of sources at or near the premises. Based on the obtained information, the behavior can be detected by way of the video cameras 15 (in the case of smart cameras with such processing capability), and/or by a computer or network video recorder 11 or server/network 18 that is communicatively coupled to the video cameras 15.

In various embodiments, there may be multiple types of video cameras 15, such as smart cameras 15 that have processing capabilities to perform one or more of the functions described in connection with the method 400, and non-smart cameras that lack processing capabilities to perform one or more of the functions described in connection with the method 400. In general, any one or more of the functions described in connection with the method 400 may be performed in a centralized manner by one or more of the cameras (or other components of networks), and/or in a distributed manner by one or more of the video cameras 15 and/or the computer or network video recorder 11, and/or the like. Additionally, the cameras, computers, and/or other components are configured, in some aspects, to communicate with one another to cooperate to execute the various functions of the method 400. For instance, in the event that a non-smart camera lacks processing capabilities to perform one or more of the functions described in connection with the method 400 (for example, a particular matching algorithm), the non-smart camera may communicate information (such as, for example, raw video data) to a smart camera and/or to a computer or other device that has the processing capabilities to perform the one or more particular functions described in connection with the method 400, so that the function(s) can be performed. Further, the non-smart camera may, in some aspects, forward to the smart camera, computer, or other device, information enabling the non-smart camera to be identified, so that if the non-smart camera captures an image of the subject, the location of the non-smart camera can be traced back and a location of the subject can be ascertained.

At 404, one or more attributes of the subject, or associated with the subject, are obtained from one or more sources. For example, an attribute of a face of the subject may be obtained by way of an image captured by way of a video camera 15, an attribute (e.g., a color, a type, and/or the like) of a clothing item that the subject is wearing can be obtained by way of an image captured by way of a video camera 15, mobile communication device data and/or a wireless signature of a mobile communication device or PDA 8 that the subject is carrying can be obtained by way of an antenna 9, and/or the like.

At 406, the one or more attributes that are associated with the subject and were obtained at 404 are transmitted or pushed to one or more other nodes (e.g., video cameras 15, antennas 9, and/or other devices resident on one or more networks) and/or networks, for instance, to enable those other nodes and/or networks to locate the subject and/or track a location of the subject. The attribute(s) can be transmitted to one or more nodes and/or networks by way of the network, or any suitable wired and/or wireless communication path or network.

At 408, a tracking loop is initiated to track a location of the subject within a first region that corresponds to the first network. The tracking loop, in some embodiments, includes performing the procedures described below in connection with 410, 412, 414, 416, 418, 420, and 422 for the particular region in which the tracking is commencing. In one example, the first region is the region where the behavior of the subject was initially detected at 402. For instance, the first region may be a retail store premises and the first network may be a network of the video cameras, the antennas 9, and/or the like that are installed at or near the first region. In some exemplary embodiments, the tracking loop is performed in parallel for multiple regions (e.g., by employing multiple nodes and/or networks, such as networks of aerial drone cameras, traffic cameras, store premises, and/or the like) in to facilitate more comprehensive tracking of the location of the subject and/or to facilitate tracking of the location of the subject across a wide area. In a further embodiment, the tracking loop is performed in parallel for multiple regions corresponding to multiple networks, and the multiple networks collaborate in tracking the location of the subject to share the processing load and/or provide more accurate or rapid tracking results.

At 410, updated and/or more recent data associated with the subject is aggregated from various sources, such as one or more of the video cameras 15, antennas 9, and/or other sources. Example types of data that can be aggregated at 410 include, without limitation, a facial image of the subject, an image of clothing worn by the subject, mobile communication device data and/or a wireless signature of a mobile communication device or PDA 8 carried by the subject, and/or other types of data.

At 412, a determination is made as to whether one or more items of data that were aggregated at 410 match the one or more attributes that were obtained at 404. For example, the determination at 412 may include comparing one or more items of data that were aggregated at 410 to the one or more attributes that were obtained at 404 to determine whether more recently captured data (such as, image data, video data, wireless communication data, and/or other types of data) correspond to the subject. In this manner, the determination at 412 can indicate whether the location of the subject in a particular region is still successfully being tracked, or whether the location of the subject is no longer successfully being tracked in the particular region and so a wider scoped search may be needed. In one example, the determination at 412 includes comparing an attribute (e.g., of a facial image) of the subject that was obtained at 404 to an attribute (e.g., of a facial image) of a person whose image was captured subsequent to the obtaining of the attribute at 404 (and, in some instance, by way of a different video camera 15) to determine whether the person whose image was subsequently captured matches the subject, thereby indicating that the location of the subject is still successfully being tracked.

In some embodiments, multiple types of attribute categories are arranged in hierarchical tiers according to complexity of processing required in detecting a match at 412. For example, a first tier of attributes for which the processing complexity required for detecting a match at 412 is minimal may include a clothing color or hair color associated with the subject. A second tier of attributes for which the processing complexity required for detecting a match at 412 is greater than that of the first tier of attributes may include mobile communication device data and/or wireless information relating to a mobile communication device carried by the subject and/or registered to the subject. A third tier of attributes for which the processing complexity required for detecting a match is even greater than that of the first and second tiers of attributes may include a gait of the subject. In this manner, depending on the tiers of attributes being employed for the matching at 412, and/or depending on the processing capabilities of the video cameras 15, nodes, and/or other sources, processing of the matching at 412 can be redirected for completion by the appropriate device.

Referring now back to 412, if it is determined at 412 that one or more items of data that were aggregated at 410 match the one or more attributes that were obtained at 404 ("YES" at 412), then the method 400 progresses to 414. At 414, a location of the subject is determined based at least in part on the information aggregated at 410 and/or on other information. For example, the determining of the location of the subject at 414 includes, in some embodiments, computing a location of the subject based on a location of the video camera 15 (or other source) from which the information was aggregated at 410.

At 416, information relating to the tracking of the location of the subject is displayed to a user (for example, a police officer or other emergency personnel) by way of a user interface, such as a graphical user interface (GUI). The GUI, in some examples, includes a map over which an overlay is displayed indicating a location of the subject being tracked. The GUI may also include additional information, such as one or more of the attributes of the subject being tracked, including for instance, a facial image of the subject obtained by way of one or more of the video cameras 15, attributes of clothing worn by the user, an attribute of a mobile communication device carried by the user, a name or other information identifying the user generated, for instance, by matching the captured facial image of the subject to a facial image stored in a database of facial images, and/or the like. In this manner, the GUI enables the user to continually track the location of the subject throughout multiple regions that may correspond to multiple nodes and/or networks.

At 418, a determination is made as to whether any additional attribute associated with the subject being tracked is available. In some examples, the determination at 418 is based at least in part on one or more items of information—such as images of the subject, video of the subject, mobile communication device data and/or wireless signatures of mobile communication devices or PDAs 8 carried by the subject, and/or the like—that have been obtained thus far by way of the video camera(s) 15, the antenna(s) 9, and/or other source(s). Example types of additional attributes that may be available include, without limitation, additional attributes of facial images captured of the subject having different angles and/or providing information beyond the information of previously obtained and recorded attributes, an attribute, such as a make, model, color, license plate number, of a vehicle that the subject has entered and is traveling in, and/or the like. By determining whether any additional attribute associated with the subject being tracked is available, a more comprehensive and robust profile of the subject may be compiled, thereby facilitating more accurate and efficient tracking of the location of the subject.

If it is determined at 418 that any additional attribute associated with the subject being tracked is available ("YES" at 418), then the method 400 proceeds to 420. At 420, the additional attribute associated with the subject being tracked is obtained by way of the video camera(s) 15, the antenna(s) 9, and/or the other source(s), and is stored in a memory for later use. At 422, the additional attribute that was obtained at 420 is transmitted or pushed to one or more other nodes and/or networks, for instance, to enable those other nodes and/or networks to more effectively locate the subject and/or track a location of the subject. From 422, or if it is determined at 418 that no additional attribute associated with the subject being tracked is available ("NO" at 418), then the method 400 proceeds back to 410 to aggregate updated and/or more recent data associated with the subject to continually track the location of the subject throughout the region.

In some embodiments, at 418, in addition or as an alternative to determining whether any additional attribute associated with the subject being tracked is available, a determination is made as to whether any attribute associated with the subject being tracked has changed. For example, in some cases the subject may be tracked based on multiple attributes, such as a hair color, a clothing color, a height, a vehicle make, a vehicle model, a vehicle color, a vehicle license plate, mobile communication device data, and/or the like. The multiple attributes may originate from a variety of sources, such as an image of the subject previously captured by the video camera(s) 15, mobile communication device information previously captured by the antenna(s) 9, intelligence provided by law enforcement personnel, and/or the like. In this manner, when an image of a person is obtained by way of the video cameras 15 and/or mobile communication device information associated with a person is obtained by way of the antenna(s) 9, the person can be identified as matching the subject who is being tracked with a degree of confidence that is proportional to the number of attributes of the person that are detected in the image as matching the multiple attributes that serve as the basis upon which the subject is being tracked. In some cases, one of the attributes of the subject may change. For example, the subject may remove a wig, change vehicles, change clothing, and/or the like in an effort to elude tracking and capture. In such cases, it may be determined at 418 that one or more of the multiple attributes have changed. In particular, if the video cameras 15 and/or antennas 9 are no longer able to detect a person matching all of the multiple (for example, five) attributes being tracked, then the computer or network video recorder 11 may search for a person matching a lesser number (for example, four or fewer) of the attributes that were previously being tracked. If a person matching the lesser number of the attributes is detected by one or more of the video cameras 15 and/or antennas 9, then that person may be flagged as a secondary subject to be tracked simultaneously while searching for the primary subject having attributes that match all the multiple attributes being tracked.

If the person matching all of the multiple attributes is no longer locatable by the images captured via the video cameras 15 and/or the information obtained by the antennas 9, then the secondary subject matching the lesser number of the attributes may be promoted to be the primary subject so that tracking resources may be appropriately and effectively allocated. In some cases, the change in attribute is verified before the secondary subject is promoted to being the primary subject. For example, the change in attribute may be verified by the processing of images captured via the video cameras 15, which detect the subject discarding a clothing item or a wig. Alternatively, the change in attribute may be verified by law enforcement personnel who locate the discarded clothing item or wig. In this regard, the computer or network video recorder 11 may provide a location and time information to law enforcement personnel based on the last known or tracked location of the primary subject matching all of the multiple attributes, to enable the law enforcement to dispatch personnel to the location to conduct the verification. Additionally, when the subject is being tracked across multiple networks, the system or network 18 can push the updated list of attributes (for example, the lesser number of attributes) to one or more other nodes (e.g., video cameras 15, antennas 9, and/or other devices resident on one or more networks) and/or networks. This facilitates improved adaptive tracking of subjects across multiple networks even when the subjects are expending effort to change their image to elude tracking and capture.

Referring back to 412, if it is determined that the one or more items of data that were aggregated at 410 do not match the one or more attributes that were obtained at 404 ("NO" at 412), then the method 400 proceeds to 424. At 424, a determination is made as to whether the subject has departed the region in which the subject previously was being tracked, for instance, the region corresponding to the premises at which the behavior was detected at 402. In some embodiments, the determination at 424 is based on the amount of time that has elapsed since the location of the subject was successfully being tracked. In particular, if the amount of time that has elapsed since the location of the subject was successfully being tracked exceeds a predetermined threshold, then it is determined at 424 that the subject has departed the region, and if the amount of time that has elapsed since the location of the subject was successfully being tracked does not exceed the predetermined threshold, then it is determined at 424 that the subject has not departed the region.

If it is determined at 424 that the subject has not departed the region in which the subject previously was being tracked ("NO" at 424), then the method 400 proceeds back to 410 to aggregate updated and/or more recent data associated with the subject to continually track the location of the subject throughout the region. If, on the other hand, it is determined at 424 that the subject has departed the region in which the subject previously was being tracked ("YES" at 424), then the method 400 progresses to 426. At 426, an alert is communicated to one or more other nodes and/or networks, by way of one or more wired and/or wireless communication paths, indicating that the subject has departed the first region in which the subject previously was being tracked, for instance, the region corresponding to the premises at which the behavior was detected at 402. In some embodiments, the alert is provided to a wide area of nodes and/or networks that are adjacent and/or proximal to the region in which the subject previously was being tracked. In this manner, the additional neighboring nodes and/or networks can attempt to locate the subject and/or track a location of the subject.

In some embodiments, the alert is provided to a select set of nodes and/or networks based on one or more factors that enable more efficient allocation of tracking resources. For example, a determination may be made as to whether any traffic cameras in the region have detected a traffic law violation, such as driving through a red light. If a traffic camera in the region has detected a traffic law violation, then, based on a prediction that the traffic law violation may have been committed by the subject fleeing the scene of a crime, the alert may be provided to one or more nodes and/or networks that overlap with a region of the traffic camera in an effort to quickly locate the customer without the need to utilize a wide array of cameras and/or other resources. In addition, based on the detection at 424 that the subject has departed the region in which the subject previously was being tracked, police or other emergency personnel can launch one or more aerial drone cameras 50 that can communicate attributes and other information with one another to facilitate a collaborative search plan, based in part on one or more neighboring regions of interest, to identify and/or track a location of the subject.

At 428, a determination is made as to whether the searching for, and/or tracking of, the location of the subject is concluded. In some embodiments, the determination at 428 is based on whether an instruction has been received from a police officer or other emergency personnel indicating that the search for the subject has been concluded, for instance, in a case where the subject has been apprehended and is in police custody. If it is determined at 428 that the searching for, and/or tracking of, the location of the subject is not concluded ("NO" at 428), then the method 400 proceeds to 430 where a tracking loop is initiated to identify and/or track a location of the subject within a second region that corresponds to a second network. The tracking loop, in some embodiments, includes performing the procedures described above in connection with 410, 412, 414, 416, 418, 420, and 422 for the particular region in which the tracking is commencing. If, on the other hand, it is determined at 428 that the searching for, and/or tracking of, the location of the subject is concluded ("YES" at 428), then the method 400 ends.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law.

What is claimed is:

1. A method for configuring a computing device in a network of at least one remote device, comprising:
   storing, in a remote device, configuration data relating to a first computing device, wherein the remote device is at least one of a traffic camera or an aerial drone camera;
   determining, by a second computing device, whether the remote device has stored therein the configuration data suitable for configuring the second computing device; and
   transferring the configuration data to the second computing device in response to the determination that the configuration data stored in the remote device is suitable for the second computing device.

2. The method in accordance with claim 1, wherein storing the configuration data is performed in accordance with a schedule.

3. The method in accordance with claim 1, wherein storing the configuration data is performed in response to an event.

4. The method in accordance with claim 3, wherein the event is selected from the group consisting of an intrusion alert, a hack-in detection, a virus detection, a malware detection, a premises burglary alarm, a malfunction detection, a software crash, a hardware error, and a power failure.

5. The method in accordance with claim 1, wherein the configuration data is stored on the remote device in an encrypted format.

6. The method in accordance with claim 1, wherein the first and second computing devices are network video recorders.

7. The method in accordance with claim 1, further comprising placing the second computing device into operable communication with the network of at least one remote device.

8. The method in accordance with claim 1, further comprising configuring the second computing device with data from the configuration data.

9. A method for configuring a computing device in a network of remote devices, comprising:
   transferring configuration data relating to a first computing device to a plurality of remote devices, wherein the plurality of remote devices includes at least one of a traffic camera or an aerial drone camera, and wherein the configuration data is apportioned among at least two of the plurality of remote devices such that each of the at least two of the plurality of remote devices stores a portion of the configuration data that is less than all of the configuration data;
   identifying, by a second computing device to be configured, which of the at least two of the plurality of remote devices has stored therein configuration data suitable for configuring the second computing device; and
   transferring the portions of the configuration data from each of the identified remote devices to the second computing device.

10. The method in accordance with claim 9, further comprising reassembling the configuration data from the portions of the configuration data.

11. The method in accordance with claim 10, wherein reassembling the configuration data from the portions of the configuration data includes confirming that the configuration data is complete.

12. The method in accordance with claim 10, further comprising configuring the second computing device using the configuration data.

13. The method in accordance with claim 9, wherein the configuration data is stored in an encrypted format.

14. The method in accordance with claim 9, wherein transferring the configuration data is performed in accordance with a schedule.

15. The method in accordance with claim 9, wherein the first and second computing devices are network video recorders.

16. The method in accordance with claim 9, further comprising placing the second computing device into operable communication with the network of remote devices.

17. A self-healing video surveillance system, comprising:
   a network video recorder storing configuration data; and
   at least one surveillance camera is in operable communication with the network video recorder, the at least one surveillance camera configured to store the configuration data of the network video recorder, wherein the at least one surveillance camera is at least one of a traffic camera or an aerial drone camera, wherein the network video recorder is configured to transfer the configuration data to and from the at least one surveillance camera.

18. The self-healing video surveillance system in accordance with claim 17, wherein the at least one surveillance camera includes an IP-based video camera.

19. The self-healing video surveillance system in accordance with claim 17, further comprising a plurality of surveillance cameras configured to store the configuration data of the network video recorder, wherein the network video recorder is configured to store the configuration data among at least two of the plurality of surveillance cameras such that each of the at least two surveillance cameras stores a portion of the configuration data.

20. The self-healing video surveillance system in accordance with claim 17, wherein the configuration data stored in the at least one surveillance camera is encrypted.

* * * * *